United States Patent
Ashoori et al.

(10) Patent No.: US 10,303,972 B2
(45) Date of Patent: *May 28, 2019

(54) SOCIAL CONNECTION VIA REAL-TIME IMAGE COMPARISON

(71) Applicant: INTERNATIONAL BUSINESS MACHINES CORPORATION, Armonk, NY (US)

(72) Inventors: Maryam Ashoori, White Plains, NY (US); Jason B. Ellis, New York, NY (US); Robert G. Farrell, Cornwall, NY (US); Jonathan Lenchner, North Salem, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/747,898

(22) Filed: Jun. 23, 2015

(65) Prior Publication Data

US 2016/0224862 A1    Aug. 4, 2016

Related U.S. Application Data

(63) Continuation of application No. 14/610,357, filed on Jan. 30, 2015.

(51) Int. Cl.
| | |
|---|---|
| G06K 9/46 | (2006.01) |
| G06K 9/62 | (2006.01) |
| H04L 12/58 | (2006.01) |
| H04L 29/08 | (2006.01) |

(52) U.S. Cl.
CPC ......... *G06K 9/4671* (2013.01); *G06K 9/6215* (2013.01); *H04L 51/04* (2013.01); *H04L 51/10* (2013.01); *H04L 51/32* (2013.01); *H04L 67/306* (2013.01)

(58) Field of Classification Search
CPC ......... H04L 51/10; H04L 51/04; H04L 51/32; H04L 51/043; H04L 67/306; G06K 9/6215; G06K 9/622; G06K 9/00221
See application file for complete search history.

(56) References Cited

U.S. PATENT DOCUMENTS

| | | | |
|---|---|---|---|
| 7,991,232 B2 | 8/2011 | Iwamoto | |
| 8,175,387 B1 * | 5/2012 | Hsieh | G06K 9/6206 382/181 |
| 8,374,914 B2 | 2/2013 | Valencia-Campo et al. | |
| 8,386,486 B2 | 2/2013 | Zhang et al. | |

(Continued)

FOREIGN PATENT DOCUMENTS

WO      2014011495      1/2014

*Primary Examiner* — Scott B Christensen
(74) *Attorney, Agent, or Firm* — Tutunjian & Bitetto, P.C.; Rahan Uddin

(57) ABSTRACT

A method and system are provided. The method includes acquiring a first image by a first user. The method further includes performing, using a processor, a comparative analysis of the first image and at least one other image acquired within a threshold time by at least one other user. The method also includes establishing a real-time communication interface between the first user and the at least one other user in response to the comparative analysis.

13 Claims, 9 Drawing Sheets

(56) References Cited

U.S. PATENT DOCUMENTS

| | | | | |
|---|---|---|---|---|
| 8,472,662 | B2* | 6/2013 | Muriello | G06Q 50/01 |
| | | | | 382/100 |
| 8,989,506 | B1* | 3/2015 | Hensel | G06T 3/4038 |
| | | | | 345/629 |
| 9,215,286 | B1* | 12/2015 | Schilit | H04L 67/22 |
| 9,286,710 | B2* | 3/2016 | Murphy-Chutorian | |
| | | | | G06T 7/97 |
| 9,652,602 | B2* | 5/2017 | King | G06K 9/00221 |
| 2009/0123021 | A1* | 5/2009 | Jung | G11B 27/28 |
| | | | | 382/100 |
| 2011/0022529 | A1 | 1/2011 | Barsoba et al. | |
| 2011/0060744 | A1* | 3/2011 | Brignull | G06Q 10/06 |
| | | | | 707/748 |
| 2011/0282860 | A1* | 11/2011 | Baarman | G06F 17/30864 |
| | | | | 707/709 |
| 2012/0230540 | A1* | 9/2012 | Calman | G06K 9/00221 |
| | | | | 382/103 |
| 2014/0108528 | A1* | 4/2014 | Papakipos | G06Q 50/01 |
| | | | | 709/204 |
| 2014/0279192 | A1* | 9/2014 | Selby | G06Q 30/0631 |
| | | | | 705/26.7 |
| 2014/0330729 | A1* | 11/2014 | Colangelo | G06Q 20/40145 |
| | | | | 705/72 |
| 2015/0095803 | A1* | 4/2015 | Tan | H04L 51/32 |
| | | | | 715/753 |
| 2015/0127486 | A1* | 5/2015 | Advani | G06Q 30/0241 |
| | | | | 705/26.41 |
| 2015/0248651 | A1* | 9/2015 | Akutagawa | G06Q 10/1095 |
| | | | | 705/7.19 |

* cited by examiner

SOCIAL CONNECTION VIA REAL-TIME IMAGE COMPARISON

CROSS-REFERENCE TO RELATED APPLICATIONS

This application is a Continuation application of co-pending U.S. patent application Ser. No. 14/610,357 filed on Jan. 30, 2015, incorporated herein by reference in its entirety.

BACKGROUND

Technical Field

The present invention relates generally to social computing and, in particular, to social connection via real-time image comparison.

Description of the Related Art

People are often looking for ways to connect with one another based on shared interests, serendipity, and so forth. With respect to photos, sometimes a person takes a picture, and there is no one available to talk with about it right at that moment. Thus, the person might manually send the picture to a friend and wait for their response, but not get that response for hours or days (if ever). If the picture is of critical importance, the person might make a video call to share the picture in real time, but this is difficult to do on today's phones. Similarly, the possible recipient of an image may be uninterested, busy, and so forth. However, there is currently no system or service available to enable users to anonymously communicate, in real-time, instantly, based on just the similarity of a photo they took to a photo taken by someone else.

SUMMARY

According to an aspect of the present principles, a method is provided. The method includes acquiring a first image by a first user. The method further includes performing, using a processor, a comparative analysis of the first image and at least one other image acquired within a threshold time by at least one other user. The method also includes establishing a real-time communication interface between the first user and the at least one other user in response to the comparative analysis.

According to another aspect of the present principles, a system is provided. The system includes an image acquisition device for acquiring a first image by a first user. The system further includes an image similarity determination device for performing a comparative analysis of the first image and at least one other image acquired within a threshold time by at least one other user. The method also includes a real-time communication establishment device for establishing a real-time communication interface between the first user and the at least one other user in response to the comparative analysis.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
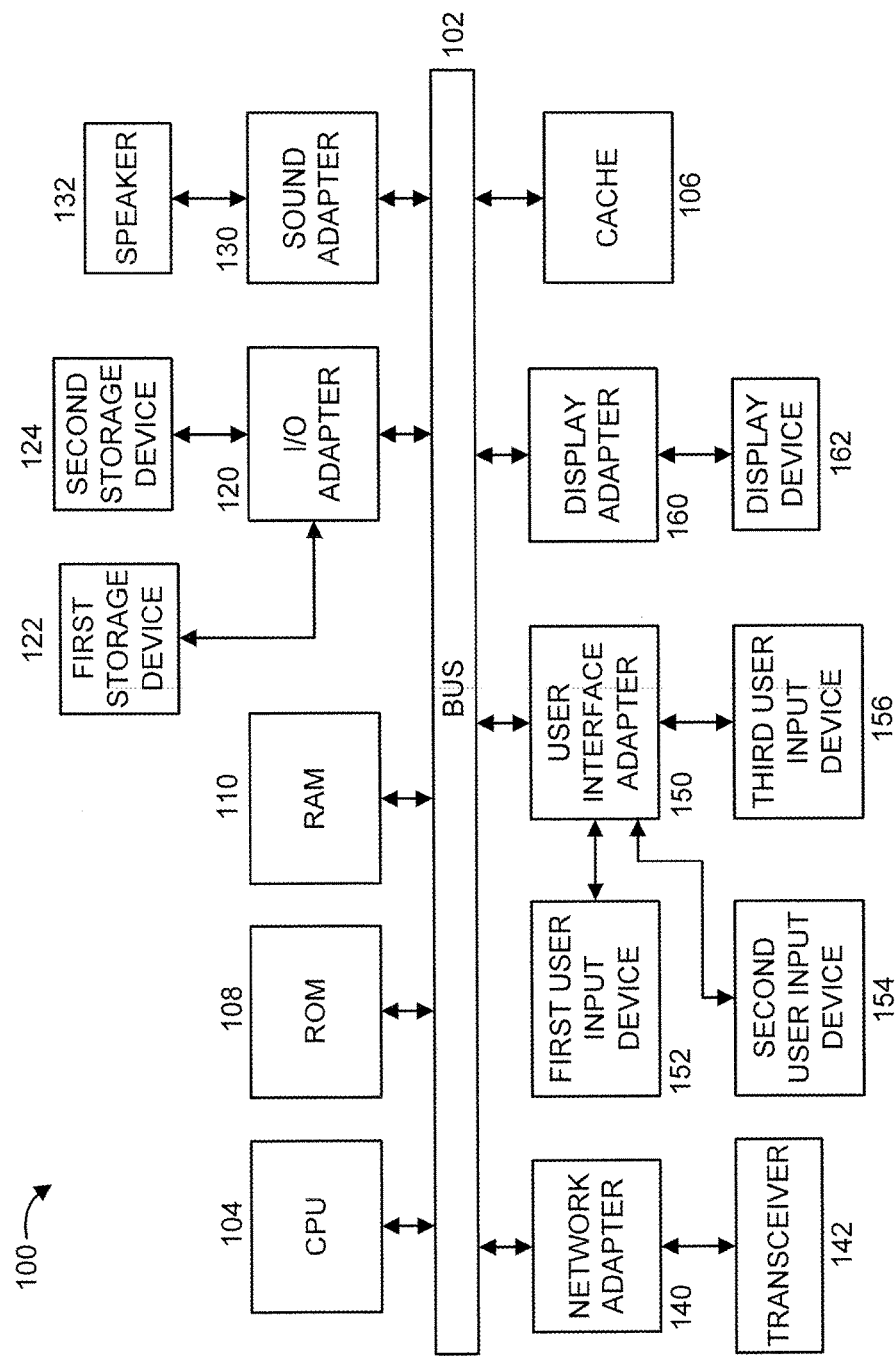
FIG. 1 shows an exemplary processing system 100 to which the present principles may be applied, in accordance with an embodiment of the present principles.

The present principles are directed to social connection via real-time image comparison. It is to be appreciated that the terms "image", "picture", and "photo" are used interchangeably herein.

In an embodiment, a social application and service are provided that can be used to establish communication among people who do not know one another. In an exemplary embodiment, a method and system implementing the social application and service are provided that can include and/or otherwise involve an acquisition of image 1 by user 1 (e.g., via a smartphone, smart glasses, tablet, and so forth) and a comparison of image 1 with another image (image 2) acquired within a threshold time T (e.g., T=10 seconds) from image 1 by another user (user 2). Based on a comparative analysis of image 1 and 2, a real-time communication interface is automatically established between user 1 and user 2. These and various other implementations of the present principles are readily determined by one of ordinary skill in the art given the teachings of the present principles provided herein, while maintaining the spirit of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
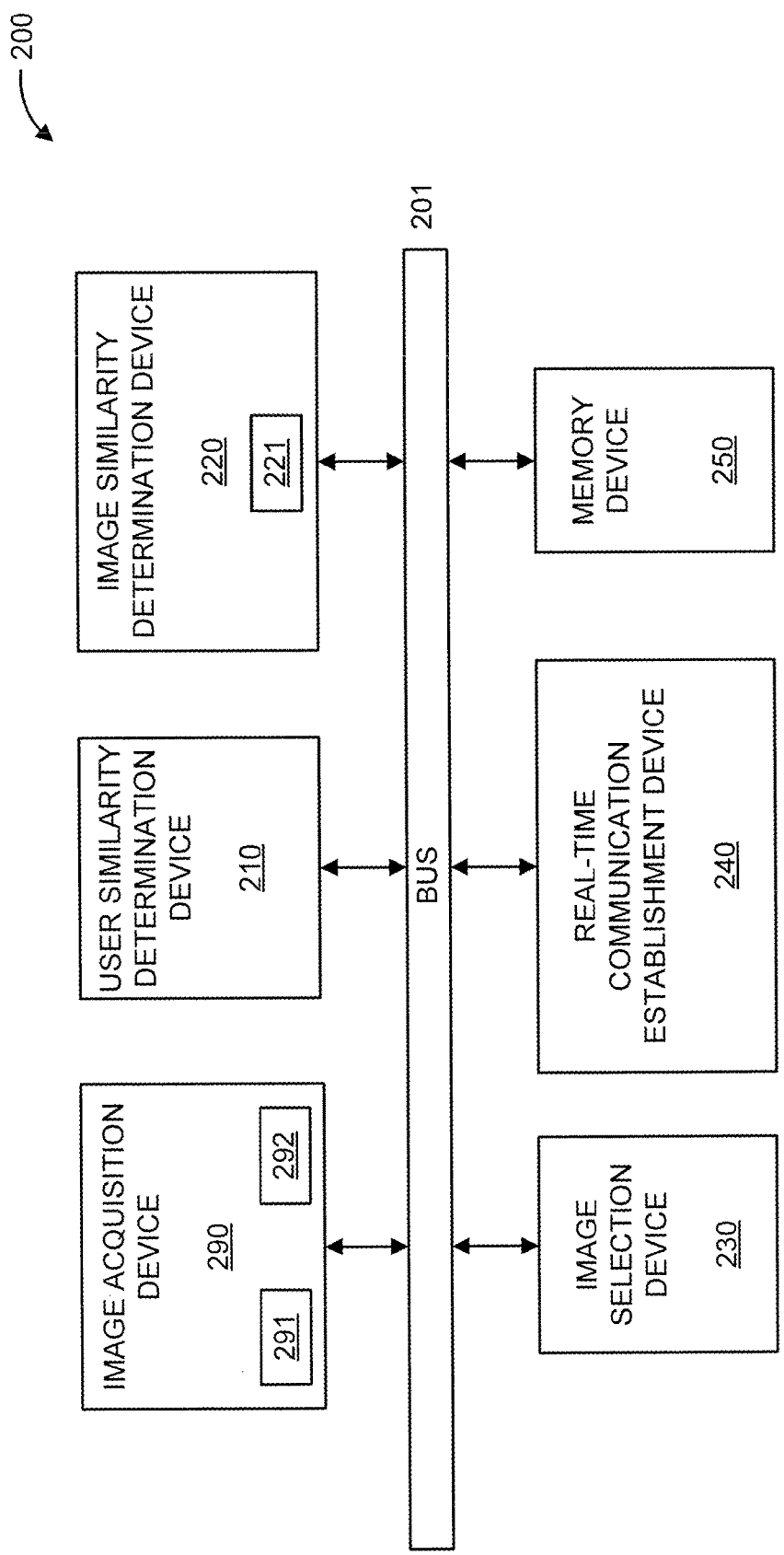
FIG. 2 shows an exemplary system 200 for social connection via real-time image comparison, in accordance with an embodiment of the present principles.

Moreover, it is to be appreciated that system 200 described below with respect to FIG. 2 is a system for implementing respective embodiments of the present principles. Part or all of processing system 100 may be implemented in one or more of the elements of system 200.

Figure 3:
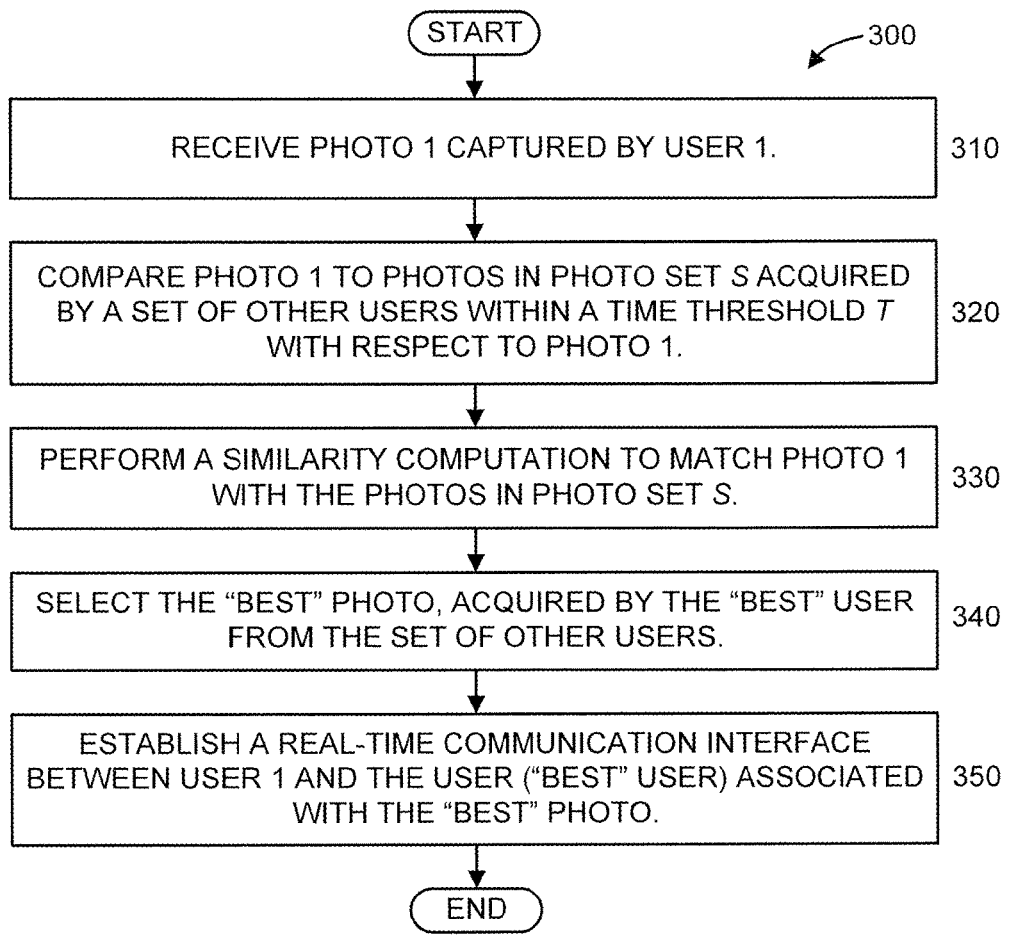
FIG. 3 shows an exemplary method 300 for social connection via real-time image comparison, in accordance with an embodiment of the present principles.
Figure 4:
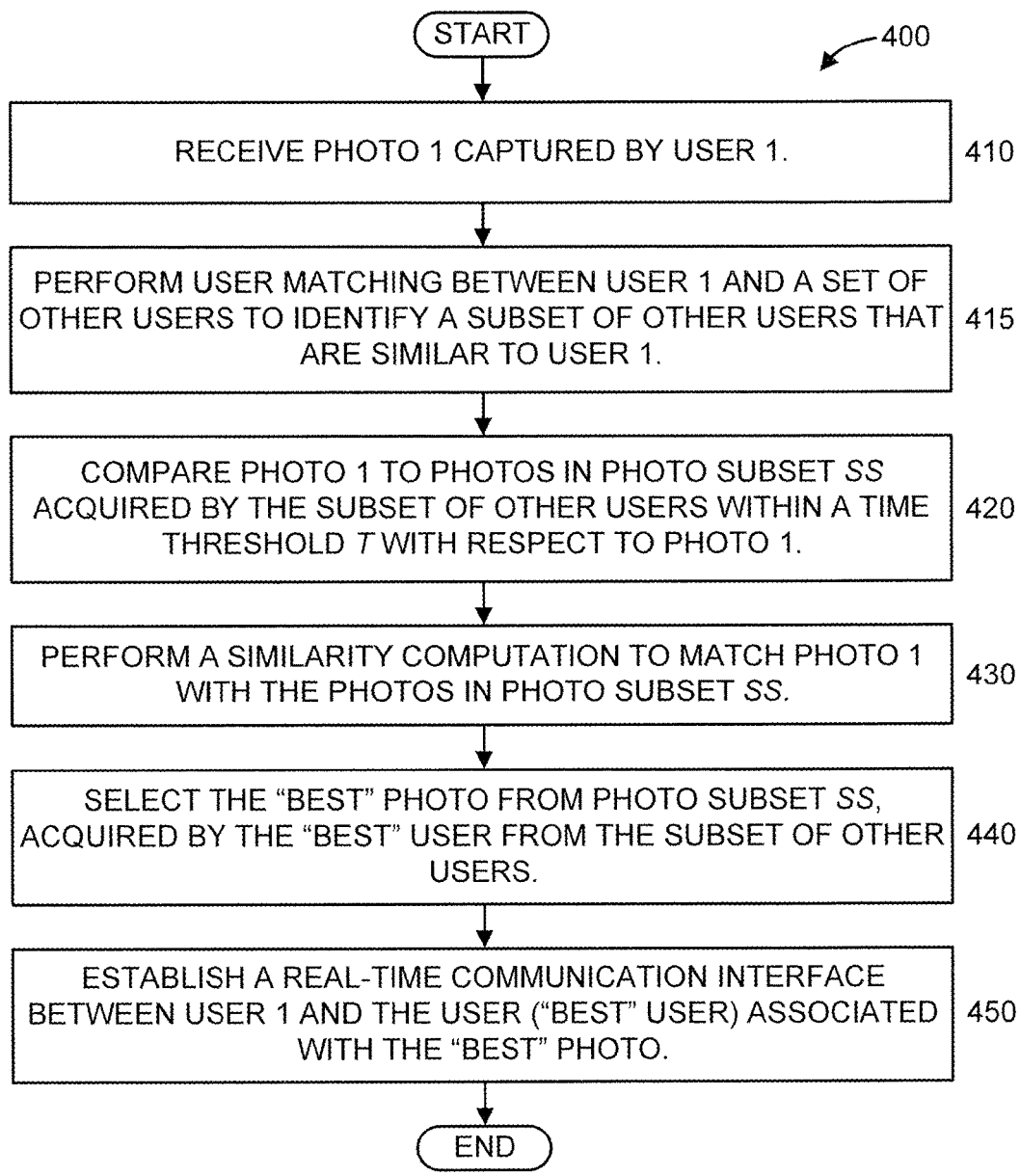
FIG. 4 shows another exemplary method 400 for social connection via real-time image comparison, in accordance with an embodiment of the present principles.
Figure 5:
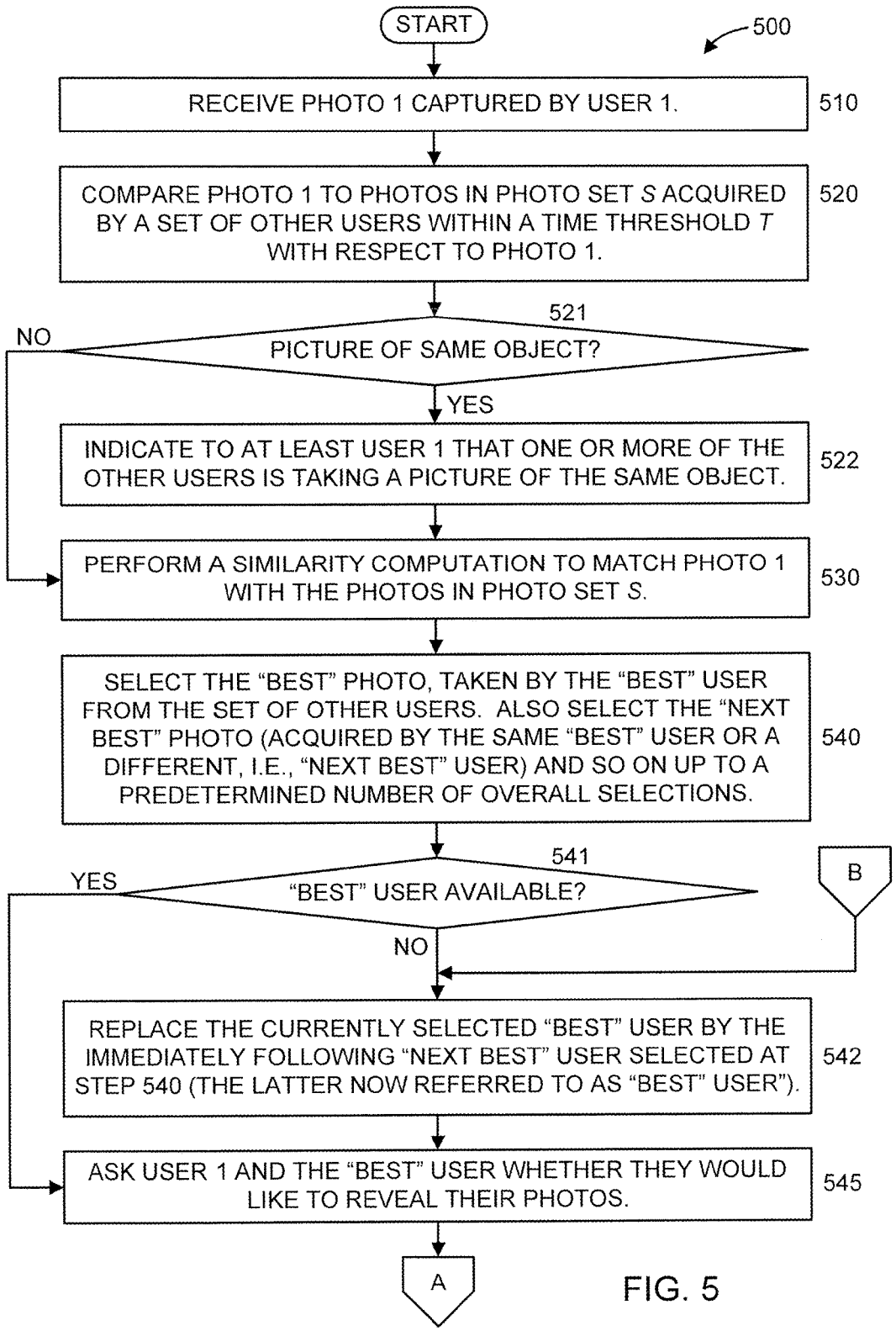
FIGS. 5-6 shows yet another exemplary method 500 for social connection via real-time image comparison, in accordance with an embodiment of the present principles.
Figure 6:
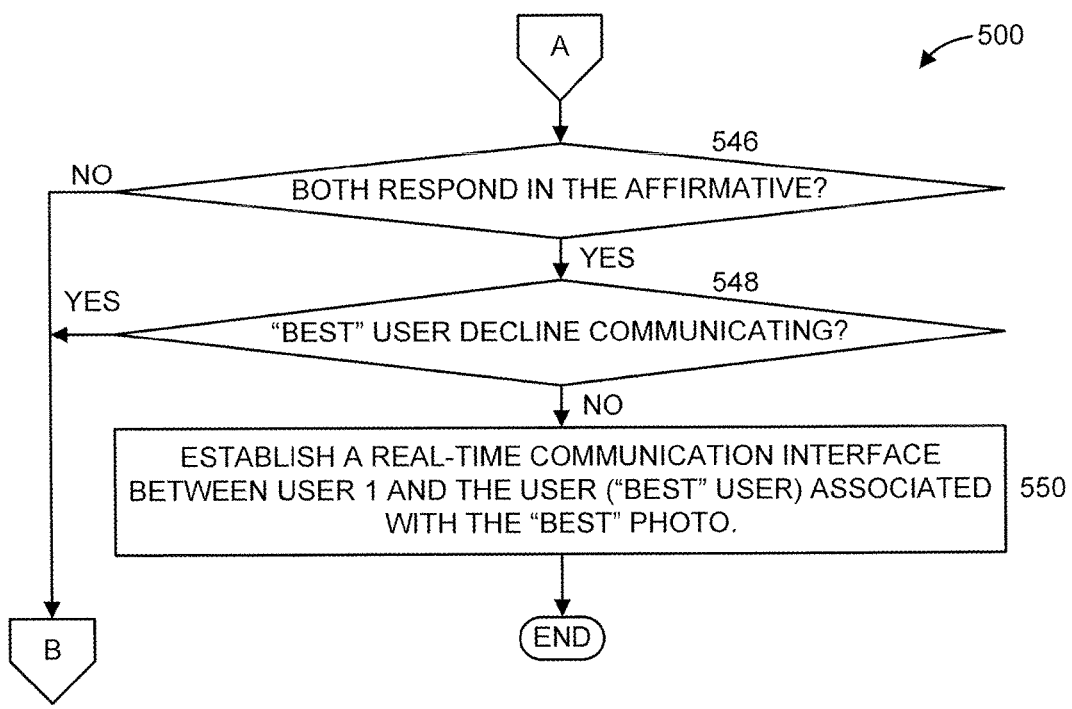

Further, it is to be appreciated that processing system 100 may perform at least part of the method described herein including, for example, at least part of method 300 of FIG. 3 and/or at least part of method 400 of FIG. 4 and/or at least part of method 500 of FIGS. 5-6. Similarly, part or all of system 200 may be used to perform at least part of method 300 of FIG. 3 and/or at least part of method 400 of FIG. 4 and/or at least part of method 500 of FIGS. 5-6.

FIG. 2 shows an exemplary system 200 for social connection via real-time image comparison, in accordance with an embodiment of the present principles.

The system 200 includes a user similarity determination device 210, an image similarity determination device 220, an image selection device 230, a real-time communication establishment device 240, and a memory device 250.

In an embodiment, the system 200 can further include and/or otherwise interface with an image acquisition device 290. The image acquisition device 290 can include an image capture device 291 and/or an image receiving device 292. Both are included in the embodiment of FIG. 2. The image capture device 291 can include, but is not limited to, a camera, a smart phone, a smart watch, smart glasses, a tablet, a personal digital assistant, a computer, and so forth. These and other image capture devices to which the present principles can be applied are readily determined by one of ordinary skill in the art, given the teachings of the present principles provided herein, while maintaining the spirit of the present principles. In an embodiment, the image receiving device 292 can include, but is not limited to, a receiver, a transceiver, a network interface card, a memory card reader, and so forth. These and other image receiving devices to which the present principles can be applied are readily determined by one of ordinary skill in the art, given the teachings of the present principles provided herein, while maintaining the spirit of the present principles.

In an embodiment, the user similarity determination device 210 can be used to determine similarity between different users. In this way, the subsequent comparison of photos by the image similarity determination device 220 can be limited to photos acquired by "similar users" as determined based on one or more criterion. In an embodiment, inverted similarity can be used. Thus, photos acquired by dissimilar individuals can also be used in the comparison of photos performed by the image similarity determination device 220. The criterion used by the user similarity determination device 210 can include, but is not limited to, geographic location, depicted objects (in an image(s)) and so forth. It is to be appreciated that the preceding criterion is merely illustrative and, thus, other criteria can also be used to determine user similarity, while maintaining the spirit of the present principles.

In an embodiment, the image similarity determination device 220 can be used to determine image similarity. In an embodiment, such image similarity can be determined based on inverted similarity. In an embodiment, the image similarity determination device 220 compares one or more images acquired by a user with one or more other images acquired (e.g., within a threshold time T) by one or more other users (and stored in, e.g., memory 250). In an embodiment, the threshold time applies to all images involved in the comparison. In an embodiment, the image similarity determination device 220 can include a smart assessment module (SAM) and/or smart assessment device (hereinafter smart assessment device 221). In an embodiment, the image similarity determination device 220 collects information and uses the information for the similarity computation. Such information collection can include, but is not limited to, feature extraction. Moreover, in an embodiment, the image similarity determination device 220 can perform image classification.

In an embodiment, the image similarity determination device 220 determines if a same object is being depicted in the pictures and, if so, indicates the same to the users. Image comparison can also be made based on metadata for the involved photos. The metadata may be automatically generated and/or may be user supplied through a user interface device that can be included in the image similarity determination device 220.

In an embodiment, the image selection device 230 can be used to select a "best image" based on one or more criterion. The criterion can include, but is not limited to, image similarity and/or inverted image similarity (e.g., as determined by the image similarity determination device 220), user availability, and so forth. These and other criteria are readily determined by one of ordinary skill in the art, while maintaining the spirit of the present principles. In an embodiment, the selection is made in consideration of user input. The user input can include the user's own selection, which can be based on data pertaining to the picture taker or the picture itself. In another embodiment, the selection can be made solely based on user input, which can override any recommendations made by the image selection device 230. These and other variations of the selection process are readily determined by one of ordinary skill in the art, while maintaining the spirit of the present principles.

In an embodiment, the image selection device 230 selects a "best" user and a predetermined number of backups ("next best" user, and so forth). Accordingly, if the "best" user is unavailable or unwilling to participate in a communication session, a "backup" user can be used instead.

Users may set additional criteria/filters for selecting/connecting to users. For example, users may elect to only connect with women, or only women in the United States. Users may of course choose to not self-identify with these characteristics. These filters can thus be incorporated into the image selection device 230. Thus, if a first best choice is filtered out, then a next best choice is selected.

In an embodiment, the real-time communication establishment device 240 establishes a communication interface between users based on the image selection. For example, in an embodiment, the real-time communication establishment device 240 establishes a communication interface between a user and each other user whose image was selected by the image selection device 230. In an embodiment, the communication interface may be via an instant message, chat, audio connection, multimedia (video) connection, and so forth. It is to be appreciated that the preceding types of communication interfaces are merely illustrative and, thus, other types of communication interfaces can also be used, while maintaining the spirit of the present principles.

Of course, the system 200 may also include other elements (not shown), as readily contemplated by one of skill in the art, as well as omit certain elements. Moreover, other arrangements of the elements of system 200 can be used. For example, while the user similarity determination device 210, the image similarity determination device 220, and the image selection device 230 are shown as separate devices in the embodiment of FIG. 2, in other embodiments, the user similarity determination device 210 and the image similarity determination device 220 can be included as part of the image selection device 230. In the embodiment shown in FIG. 2, the elements thereof are interconnected by a bus 202. However, in other embodiments, other types of connections can also be used. Moreover, in an embodiment, at least one of the elements of system 200 is processor-based. These and other variations of the elements of system 200 are readily contemplated by one of ordinary skill in the art given the teachings of the present principles provided herein, while maintaining the spirit of the present principles.

FIG. 3 shows an exemplary method 300 for social connection via real-time image comparison, in accordance with an embodiment of the present principles.

At step 310, receive a photo (hereinafter "photo 1") captured by a user (hereinafter "user 1").

At step 320, compare photo 1 to a set of photos (hereinafter "photo set S"), acquired by a set of users (hereinafter "set of other users") within a time threshold (e.g., T=10 seconds) with respect to photo 1. It is to be appreciated that time threshold T can be set by any of the users (from among user 1 and the set of other users) or can be set automatically. In an embodiment, user 1 sets the time threshold T. In another embodiment, each of the users sets their own time threshold T_user. In an embodiment, step 320 collects information that can be used for the similarity computation performed at step 330. Such information collection can include, but is not limited to, feature extraction. Moreover, in an embodiment, step 320 can include image classification.

At step 330, perform a similarity computation to match photo 1 with the photos in photo set S.

At step 340, select the "best" photo from photo set S, acquired by the "best" user from the set of other users.

At step 350, establish a real-time communication interface between user 1 and the user (best user) associated with "best" photo.

When performed in a virtual world embodiment, the "photos" can involve image captures within a virtual world. Communication between users, represented by avatars, may be through various ways including, but not limited to, any of the following: chats; other forms of text; audio; video; and so forth.

Note also that in an embodiment, user matching may be based on other characteristics prior to image similarity (e.g., location, then image similarity, so user 1 will only be matched a user 2 in their own geography). Also, in an embodiment, user matching may be based on inverted similarity (e.g., user 1 is matched with the user 2 who has acquired the image most dissimilar to the image of user 1). In an embodiment, users may be matched based on their most recent photo in addition to some or all of the previous photos they have acquired. In an embodiment, the service may place 3 or more users with similar photos into a multi-way chat (e.g., Internet Relay Chat (IRC), and so forth, as opposed to instant messaging). In an embodiment, image acquisition may be performed in a virtual world (e.g., Second Life, World of Warcraft, and so forth). In an embodiment, the selection of user 2 may be based on availability in addition to the output of the comparative analysis of the images. In an embodiment, the comparative analysis may be based upon features extracted independently by each device. The features extracted may be objects (e.g., a cat). The features extracted may identify a place (e.g., the Grand Canyon). The features extracted may be text (e.g., the words "Paradise Lost"). It is to be appreciated that the preceding types of features are merely illustrative and, thus, other types of features can also be used, while maintaining the spirit of the present principles.

FIG. 4 shows another exemplary method 400 for social connection via real-time image comparison, in accordance with an embodiment of the present principles.

At step 410, receive a photo (hereinafter "photo 1") captured by a user (hereinafter "user 1").

At step 415, perform user matching between user 1 and a set of other users (hereinafter "set of other users") to identify a subset of the other users (hereinafter "subset of other users") that are similar to user 1. In an embodiment, the set of other users is associated with a set of photos (acquired by the set of other users), such that the subset of other users is associated with a subset of the photos.

At step 420, compare photo 1 to a subset of photos (hereinafter "photo subset SS"), acquired by the subset of other users within a time threshold (e.g., T=10 seconds) with respect to photo 1. It is to be appreciated that time threshold T can be set by any of the users (from among user 1 and the subset of other users) or can be set automatically. In an embodiment, user 1 sets the time threshold T. In another embodiment, each of the users sets their own time threshold T_user. In an embodiment, step 420 collects information that can be used for the similarity computation performed at step 430. Such information collection can include, but is not limited to, feature extraction. Moreover, in an embodiment, step 420 can include image classification.

At step 430, perform a similarity computation to match photo 1 with the photos in photo subset SS.

At step 440, select the "best" photo from photo subset SS, acquired by the "best" user from the set of other users.

At step 450, establish a real-time communication interface between user 1 and the user (best user) associated with "best" photo.

Thus, as compared to method 300, method 400 limits the overall number of photos that are compared based on user similarity. These and other variations of the present principles are readily determined by one of ordinary skill in the art, given the teachings of the present principles provided herein, while maintaining the spirit of the present principles.

As noted above, threshold time T can be set by the user and/or an automated process. The automated process can take into consideration one or more of the following: geographical locations of users; time of day; the need for extra time to establish a match; and so forth. It is to be appreciated that the preceding bases for setting threshold time T are merely illustrative and, thus, other bases can also be used, while maintaining the spirit of the present principles. Moreover, note that each user may set their own time threshold T_user, so that if a first user sets a time threshold of T=10 seconds, then as long as a next user snaps a comparable image within 10 seconds, they will be connected, while if a second user sets a time threshold of T=15, and their image is not immediately similar enough to another user's image, then the second user's time threshold takes effect. Moreover, while some examples provided herein specify the time threshold T to be 10 seconds, it is to be appreciated that any threshold time can be used.

The image selection device 230 can select from several possible candidate images for image 2 and choose the "best" user 2 based on any of: a more precise assessment of image 2; various characteristics of user 2; other demographics of user 2; and so forth. Additionally or alternatively, user 1 may be presented with several possible candidates for image 2, and several characteristics of user 2, and may make a choice.

User 1 may choose both candidates and start a chat room. An example is Maryam from New Jersey, Joe from Paris, and Rob from Whales took pictures of their German Shepherds dogs within the last 10 seconds and now they start a group chat to talk about their dogs.

Note that the present principles may also have very wide application when the image acquisition is performed in a virtual world. (e.g., Second Life). The world of three-dimensional (3D) gaming and virtual worlds have great potential for future growth. Thus, when performed in a virtual world embodiment, the "photos" can involve image captures within a virtual world. Communication between users, represented by avatars, may be through various ways including, but not limited to, any of the following: chats; other forms of text; audio; video; and so forth.

Users may set additional criteria/filters for connecting to users. For example, users may elect to only connect with women, or only women in the United States. Users may of course choose to not self-identify with these characteristics.

A description will now be given of exemplary uses of the present principles, in accordance with an embodiment of the present principles.

The following tests and mock-ups were used based on Google "search by images". The user 2 images were discovered algorithmically based on image similarity and/or other useful factors. In the proposed inventive service disclosed herein, this finding of similarity would establish a communications connection between German shepherd dog lovers who are in the act of playing with balls within a threshold time of 10 seconds.

User 1 photo is from Maryam from New Jersey, who has a love of German Shepherds and takes the user 1 photo at 1:20 PM.

Two candidate User 2 photos from around the world done by automated image comparison (not human image comparison), along with image tags (optional, if useful), are as follows: Joe from Paris at 1:19 PM; and Rob from Whales at 1:18 PM.

Rob from Whales is selected by the image selection device 230, and Maryam is connected to Rob via a chat.

Of course, many ways exist for determining image similarities and contents, and such methods and comparisons may be augmented by metadata, when available. The structural similarity (SSIM) index is a method for measuring the similarity between two images. Of course, other methods may be used, while maintaining the spirit of the present principles. The SSIM metric is calculated on various windows of an image. The measure between two windows x and y of common size N×N is:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

where $\mu_x$, is the average of x; $\mu_y$ is the average of y; $\sigma_x^2$ is the variance of x; $\sigma_y^2$ is the variance of y; $\sigma_{xy}$ is the covariance of x and y; and $c_1=(k_1L)^2$, $c_2=(k_2L)^2$ are two variables to stabilize the division with weak denominator.

Additionally, Deep Neural Networks (DNNs) may be employed to help assess similarity of objects in images. For example, DNNs have been demonstrated to have outstanding performance on image classification tasks, including recognizing objects such as animals. Various different approaches may be used together to augment classification accuracy.

The resultant SSIM index is a decimal value between −1 and 1, and the value 1 is only reachable in the case of two identical sets of data.

If desired, users may have the option of supplying "interest" tags, helping the smart assessment device and/or other element of system 200 pair a user with a stranger who has something in common with the user.

As another example, a user may take a photo of purple shoes. A user (user 1) has the option of supplying metadata to aid the comparison, such as "purple shoes" or "footwear". Another user (user 2) may have also done the same.

User 1 may actually see the set of related potential images taken within a time threshold and, in real-time, manually select the other shoes, resulting in the establishment of a real-time communication with user 2. Of course, the selection of user 2 may also be done in an automated fashion.

Why should the value of T be small? It is useful that this process takes place in real-time with the value of T being small, as it encourages interactions among people engaged in a current activity, like both people taking a photo of shoes, and expressing a desire to use the photo to establish a communication. Not only is this compelling from a social standpoint, but it also helps ensure that both people are awake, near their devices, and interested in real-time communication. It gives a sense of similarity in global activities, for example, what similar interests and activities exist in a country or global context. When performed in a virtual world embodiment, the "photos" can be used to also establish a real-time communication between users who are currently actually "logged onto" the virtual world or 3D game and users who are currently active in such worlds.

A description will now be given of some issues that some implementations of the present principles may encounter as well as ways to mitigate these issues.

A. Error in the Image Analysis

This could result in the parties getting connected over images that are not really similar. To mitigate this, one could exchange images before communication. Also, optional metadata provided by the user may increase the confidence in image similarity. For example, the following steps can be performed in the case of an error in the image analysis:

1. Indicate that another user is taking a picture of the same object (e.g., type of dog, landmark, and so forth).
2. Ask if the users wants to reveal their photos.
3. If both users would like to reveal their photos, then exchange the photos. At this point, the analysis of the photos could be used to highlight objects. The user could select one to discuss, for example.
4. Ask if the other user wants to chat about the photo.
5. If both users want to chat, then establish the communications channel. Thus, the app would offer photo sharing, critique, reputation, and so forth in addition to communication. This would help validate the photo before spending the time on communication.

B. Inappropriate Photo

If there is a photo preview option, the photos taken could be unsuitable or inappropriate for the other party. If this is an issue, this could be mitigated by making the match threshold very high so that the images need to be nearly identical. Alternatively, various photo filtering algorithms could be applied to quickly flag inappropriate content. Also, optional metadata provided by the user may increase the confidence in image similarity.

C. Inappropriate Chat

If this is an issue, then users could be made aware that their chat is being monitored by the service and inappropriate language will not be tolerated. If this seems too intrusive, known methods for automatically identifying "bad words" can be used.

D. Lack of Availability

If the person took the picture, but is not available for communication, that might be annoying to the user who decided they wanted to chat. One way to mitigate this is to provide a queue of users with matches on the photo, and simply switch to the next user. The ordering of the possible users could be based upon the degree of match of the photos, but also the potential availability of the user and the suitability in other respects (e.g., user models: both from Kansas; both went to same school; and so forth).

Also, a button on the camera or phone may actually be used to indicate a desire to share, an amount of availability, and so forth.

E. The Other User is Taking the Picture for a Different Reason.

One user may be taking a picture of a hotel because they are staying there and the other user may be taking the picture because it is an eyesore they would like to tear down. Users can be given an option to communicate. The second user would likely not select to communicate. Also, optional metadata provided by the user may increase the confidence in image similarity or user's intent.

FIGS. 5-6 show yet another exemplary method 500 for social connection via real-time image comparison, in accordance with an embodiment of the present principles.

At step 510, receive a photo (hereinafter "photo 1") captured by a user (hereinafter "user 1").

At step 520, compare photo 1 to a set of photos (hereinafter "photo set S"), acquired by a set of users (hereinafter "set of other users") within a time threshold (e.g., T=10 seconds) with respect to photo 1. It is to be appreciated that time threshold T can be set by any of the users (from among user 1 and the set of other users) or can be set automatically. In an embodiment, user 1 sets the time threshold T. In another embodiment, each of the users sets their own time threshold T_user. In an embodiment, step 520 collects information that can be used for the similarity computation performed at step 530. Such information collection can include, but is not limited to, feature extraction. Moreover, in an embodiment, step 520 can include image classification.

At step 521, determine whether any of the other users (in the set of other users) is taking a picture of the same object. If so, then the method continues to step 522. Otherwise, the method continues to step 530.

At step 522, indicate to at least user 1 that one or more of the other users (in the set of other users) is taking a picture of the same object.

At step 530, perform a similarity computation to match photo 1 with the photos in photo set S.

At step 540, select the "best" photo from photo set S, acquired by the "best" user from the set of other users. Also select the "next best" photo (acquired by the same "best" user or a different, i.e., "next best" user) and so on up to a predetermined number of overall selections (when possible). In an embodiment, the selection is made by the image selection device. In an embodiment, the selection is made in consideration of user input. The user input can include the user's own selection, which can be based on data pertaining to the picture taker or the picture itself. In another embodiment, the selection can be made solely based on user input. These and other variations of the selection process are readily determined by one of ordinary skill in the art, while maintaining the spirit of the present principles.

At step 541, determine whether the "best" user is available for communication with user 1. If so, then the method proceeds to step 542. Otherwise, the method proceeds to step 545.

At step 542, replace the currently selected "best" user by the immediately following "next" best user selected at step 540 (who is hereinafter now referred to as the "best" user).

At step 545, ask user 1 and the "best" user whether they would like to reveal their photos.

At step 546, determine whether both user 1 and the "best" user responded in the affirmative regarding revealing their photos. If so, the method continues to step 550. Otherwise, the method returns to step 542.

At step 548, determine whether the "best" user is willing to communicate with user 1. If so, then the method proceeds to step 550. Otherwise, the method returns to step 542.

At step 550, attempt to establish a real-time communication interface between user 1 and the user (best user) associated with "best" photo.

A description will now be given regarding additional implementation considerations, in accordance with an embodiment of the present principles.

The image analysis could be performed on the hardware device(s) (e.g., image similarity determination device 220), in the application/method (steps 330, 430, and 530 of FIGS. 3, 4, and 5, respectively), or in the cloud. A further description of cloud computing is provided herein below.

Communication could be established as a photo call, instant message, Voice over Internet Protocol (VoIP), Short Message Service (SMS), video link, emoticon, and so forth.

An article claims approximately 200,000 photos are uploaded to the Internet every minute. This would result in 40 billion analysis needed per minute.

Since pairwise comparisons between images can be expensive, one solution is to extract N features from each image in parallel (i.e., use image classification), then do hashing. For example, the system may be able to recognize 2000 types of cars and then the 200,000 images per minute might include 20 cars and then hashed might yield 1 or 2 pairings. Since images of objects may not be taken from the same vantage point, it may be important to store images from multiple angles to be able to pair people photographing the same object. This is plausible for landmarks, consumer products, and other objects that are known prior to the image capture. Also, optional metadata provided by the user may increase the confidence in image similarity or user's intent.

A description will now be given of several scenarios to which the present principles can be applied, in accordance with various embodiments of the present principles.

With the disclosed system, method, and service, the system examines a photo a user acquires (with his or her permission) and instantly "connects to" someone else who is taking a very similar photo, somewhere in the world, at the same time (e.g., within a time threshold of 10 seconds or whatever time is designated). People generally sign up for such services because they enjoy some social serendipity, at least with respect to certain interests and photos.

Example: I take a photo of my German shepherd dog playing with a ball, using my smart phone or Google Glass. I am instantly put in contact with someone in France who took a nearly identical photo at the same time. For example, automatically I see their photo, and an instant message/chat or audio connection is established. Socially, this is amazingly fun. It involves technology for image recognition and technology for triggering this with privacy. The photo analysis portion may be implemented in a cloud system. A further description of cloud computing is provided herein below.

Other examples can include, but are not limited to the following. I am taking a photo of my sushi. I am taking a photo of a book. I am reading. I am taking a photo of an item I need help with. I am taking photo of my fish tank, plant, car, car part, computer part, defective computer part, defective car part, religious object, shoes, purses, dresses, high-tech devices, and so forth. The preceding items are merely illustrative and the present principles can be applied to photos of any subject matter.

A user may have a defective part and wish to be connected to others taking a photo of the part. A user may have a skin rash and wish to be connected to others taking a photo of the rash.

Of course, this use of this system may go beyond establishing a social connection between strangers and may be useful in buying and selling scenarios, and so forth.

More generally, the present principles enable individuals to quickly capture a rich description of their context/interests, in the moment, and use that context as a way to meet new people with similar context/interests in real-time. These and other applications to which the present principles can be applied are readily determined by one of ordinary skill in the art, while maintaining the spirit of the present principles.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
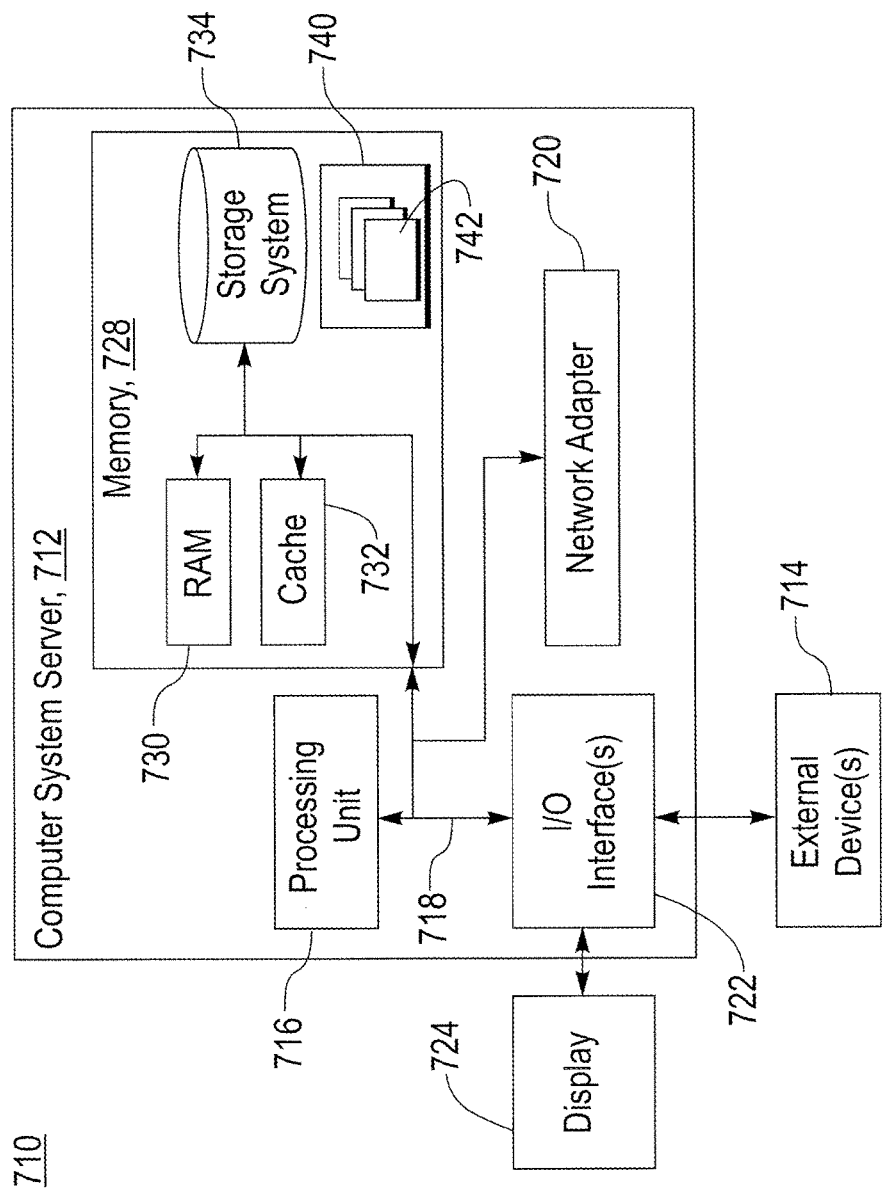
FIG. 7 shows an exemplary cloud computing node 710, in accordance with an embodiment of the present principles.

Referring now to FIG. 7, a schematic of an example of a cloud computing node 710 is shown. Cloud computing node 710 is only one example of a suitable cloud computing node and is not intended to suggest any limitation as to the scope of use or functionality of embodiments of the invention described herein. Regardless, cloud computing node 710 is capable of being implemented and/or performing any of the functionality set forth hereinabove.

In cloud computing node 710 there is a computer system/server 712, which is operational with numerous other general purpose or special purpose computing system environments or configurations. Examples of well-known computing systems, environments, and/or configurations that may be suitable for use with computer system/server 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 712 in cloud computing node 710 is shown in the form of a general-purpose computing device. The components of computer system/server 712 may include, but are not limited to, one or more processors or processing units 716, a system memory 728, and a bus 718 that couples various system components including system memory 728 to processor 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 712 typically includes a variety of computer system readable media. Such media may be any available media that is accessible by computer system/server 712, and it includes both volatile and non-volatile media, removable and non-removable media.

System memory 728 can include computer system readable media in the form of volatile memory, such as random access memory (RAM) 730 and/or cache memory 732. Computer system/server 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, memory 728 may include at least one program product having a set (e.g., at least one) of program modules that are configured to carry out the functions of embodiments of the invention.

Program/utility 740, having a set (at least one) of program modules 742, may be stored in memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system/server 712 may also communicate with one or more external devices 714 such as a keyboard, a pointing device, a display 724, etc.; one or more devices that enable a user to interact with computer system/server 712; and/or any devices (e.g., network card, modem, etc.) that enable computer system/server 712 to communicate with one or more other computing devices. Such communication can occur via Input/Output (I/O) interfaces 722. Still yet, computer system/server 712 can communicate with one or more networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or software components could be used in conjunction with computer system/server 712. Examples, include, but are not limited to: microcode, device drivers, redundant processing units, external disk drive arrays, RAID systems, tape drives, and data archival storage systems, etc.

Figure 8:
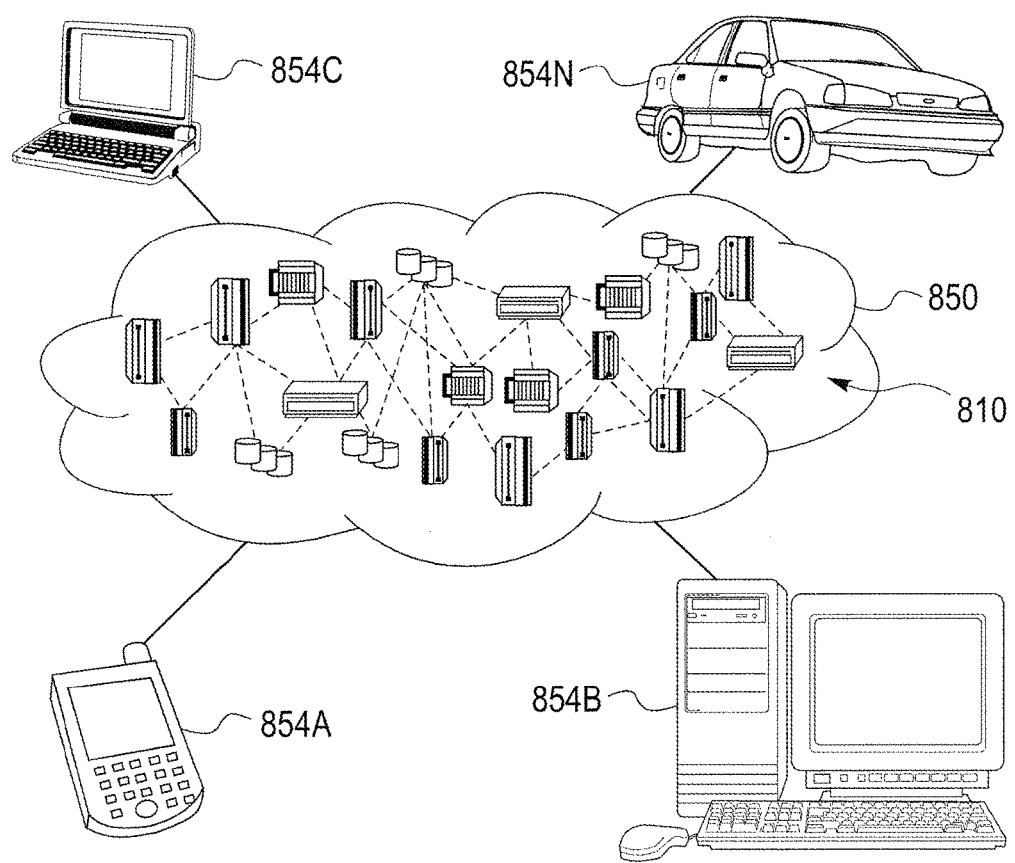
FIG. 8 shows an exemplary cloud computing environment 850, in accordance with an embodiment of the present principles.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
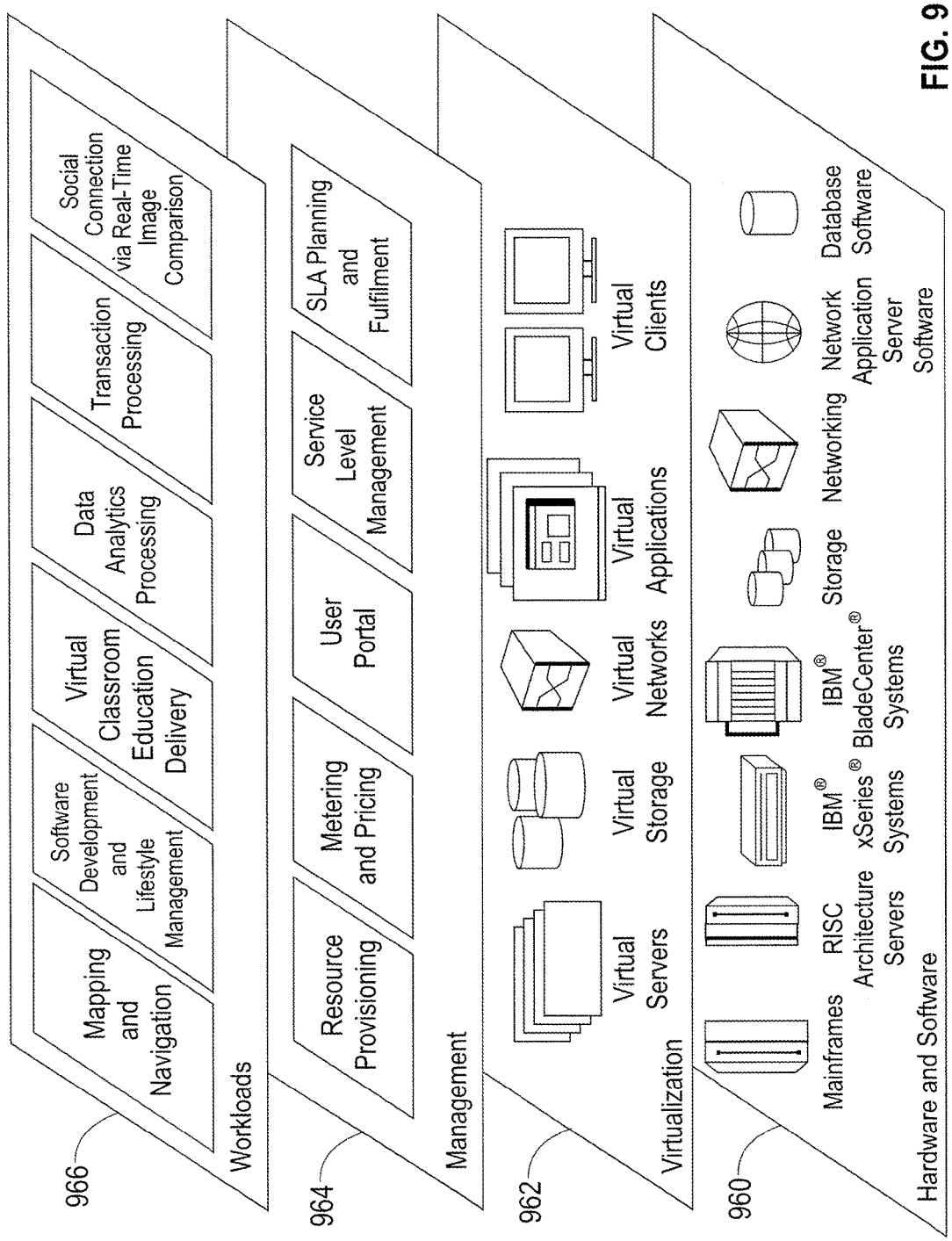
FIG. 9 shows exemplary abstraction model layers, in accordance with an embodiment of the present principles.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 962 provides an abstraction layer from which the following examples of virtual entities may be provided: virtual servers; virtual storage; virtual networks, including virtual private networks; virtual applications and operating systems; and virtual clients.

In one example, management layer 964 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 966 provides examples of functionality for which the cloud computing environment may be utilized. Examples of workloads and functions which may be provided from this layer include: mapping and navigation; software development and lifecycle management; virtual classroom education delivery; data analytics processing; transaction processing; and social connection via real-time image comparison.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
    capturing, by an image capture device, a first image by a first user;
    performing, using a processor, a comparative analysis of the first image acquired captured by the first user and at least one other image captured by at least one other user; and
    establishing a real-time communication interface between the first user and the at least one other user in response to the comparative analysis,
    wherein the comparative analysis is automatically and only performed responsive to the first image and the at least one other image being respectively captured by the first user and the at least one other user within each of a respective user-settable predetermined threshold time respectively set by the first user and the at least one other user.

2. The method of claim 1, wherein the image capture device is any of a camera, a smartphone, smart glasses, a smart watch, and a tablet.

3. The method of claim 1, wherein the comparative analysis comprises a similarity assessment.

4. The method of claim 1, wherein the communication interface supports at least one of an instant message, a chat, an audio connection, a video connection, and a multimedia connection.

5. The method of claim 1, wherein the at least one other image comprises a plurality of other images and the at least one other user comprises a plurality of other users, and the method further comprises selecting a best one of the plurality of other images, using a smart assessment device, in response to at least one of, characteristics of the plurality of other images, characteristics of the plurality of other users, other demographics of the plurality of other users, and geographic locations of the plurality of other users.

6. The method of claim 1, wherein said performing step comprises performing user matching and performing image matching subsequent to the user matching to restrict the image matching between matching users.

7. The method of claim 1, wherein said performing step comprises performing user matching based on inverted similarity.

8. The method of claim 1, wherein said performing step comprises performing user matching that matches users based on a most recently captured image and some or all previously captured images.

9. The method of claim 1, wherein the at least one other image comprises a plurality of other images and the at least one other user comprises a plurality of other users, and wherein said establishing step comprises placing the first user and at least two of the plurality of other users with similar images into a multi-way chat session.

10. The method of claim 1, wherein image capture is performed in a virtual world.

11. The method of claim 1, wherein the at least one other image comprises a plurality of other images and the at least one other user comprises a plurality of other users, and the method further comprises selecting one of the plurality of other images corresponding to one of the plurality of other users, using a smart assessment device, responsive to the comparative analysis and an availability of the one of the plurality of other users.

12. The method of claim 1, wherein the comparative analysis is based upon features independently extracted from image capture devices used to capture the first image and the at least one other image.

13. The method of claim 12, wherein the features comprise at least one of objects, location indicia, and text.

* * * * *